(12) United States Patent
Liao et al.

(10) Patent No.: US 10,300,684 B2
(45) Date of Patent: May 28, 2019

(54) INSULATION FILM AND METHOD FOR MAKING INSULATION FILM

(71) Applicant: Illinois Tool Works Inc., Glenview, IL (US)

(72) Inventors: Hong Chuan Liao, Shanghai (CN); Chris Benson, Addison, IL (US); Yong Liang, Shanghai (CN); Tom Carlson, Addison, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/649,027

(22) PCT Filed: Nov. 21, 2013

(86) PCT No.: PCT/US2013/071341
§ 371 (c)(1),
(2) Date: Jun. 2, 2015

(87) PCT Pub. No.: WO2014/088831
PCT Pub. Date: Jun. 12, 2014

(65) Prior Publication Data
US 2016/0059523 A1 Mar. 3, 2016

(30) Foreign Application Priority Data

Dec. 3, 2012 (CN) .......................... 2012 1 0510162
Dec. 3, 2012 (CN) .......................... 2012 1 0511014

(51) Int. Cl.
*B32B 27/36* (2006.01)
*B32B 27/08* (2006.01)
(Continued)

(52) U.S. Cl.
CPC .......... *B32B 27/08* (2013.01); *B29C 47/0021* (2013.01); *B29C 48/0011* (2019.02); *B29C 48/08* (2019.02); *B29C 48/21* (2019.02); *B29C 66/83411* (2013.01); *B32B 27/18* (2013.01); *B32B 27/32* (2013.01); *B32B 27/36* (2013.01); *B32B 27/365* (2013.01); *B32B 37/08* (2013.01); *B32B 37/1027* (2013.01); *B32B 37/12* (2013.01); *B32B 37/153* (2013.01); *B29K 2023/06* (2013.01); *B29K 2023/12* (2013.01); *B29K 2069/00* (2013.01); *B29K 2995/0007* (2013.01); *B29L 2007/00* (2013.01); *B29L 2009/00* (2013.01); *B29L 2031/3412* (2013.01); *B32B 2250/03* (2013.01); *B32B 2250/242* (2013.01); *B32B 2250/244* (2013.01); *B32B 2264/0278* (2013.01); *B32B 2264/0285* (2013.01); *B32B 2307/206* (2013.01); *B32B 2307/3065* (2013.01); *B32B 2307/558* (2013.01); *B32B 2307/5825* (2013.01); *B32B 2323/04* (2013.01); *B32B 2323/10* (2013.01); *B32B 2457/00* (2013.01); *B32B 2457/04* (2013.01); *Y10T 428/2495* (2015.01);
(Continued)

(58) Field of Classification Search
CPC ....... Y10T 428/2495; Y10T 428/31507; Y10T 428/31786; B29C 47/0021; B29C 47/004; B29C 47/065; B29C 66/83411; B29K 2023/06; B29K 2023/12; B29K 2069/00; B29K 2995/0007; B29L 2007/00; B29L 2009/00; B29L 2031/3412; B32B 2250/03; B32B 2250/242; B32B 2250/244; B32B 2264/0278; B32B 2264/0285; B32B 2307/206; B32B 2307/3065; B32B 2307/558; B32B 2307/5825; B32B 2323/04; B32B 2323/10; B32B 2457/00; B32B 37/1027; B32B 37/12; B32B 37/153
See application file for complete search history.

(56) References Cited

U.S. PATENT DOCUMENTS 4,477,544 A  10/1984  Bruder
4,824,723 A   4/1989  Campbell
(Continued)

FOREIGN PATENT DOCUMENTS

CN    1735508 A    2/2006
CN  201889935 U    7/2011
(Continued)

OTHER PUBLICATIONS

International Search Report for PCT/US2015/036133 dated Aug. 31, 2015, 4 pages.
(Continued)

*Primary Examiner* — Lawrence D Ferguson
(74) *Attorney, Agent, or Firm* — Klintworth & Rozenblat IP LLP

(57) ABSTRACT

The present invention provides an insulation film, comprising a film upper layer (101) and a film lower layer (103), wherein both of the film upper layer (101) and film lower layer (103) are made of a PP material, the PP material contains a flame retardant to meet the flame retardance thereof; a film intermediate layer (102) located between the film upper layer (101) and the film lower layer (103), the film intermediate layer (102) is made of a PP or PE material does not contain a flame retardant or contains a small amount of flame retardant; an upper surface of the film intermediate layer (102) is bound together with a lower surface of the film upper layer (101), a lower surface of the film intermediate layer (102) is bound together with an upper surface of the film lower layer (103).

25 Claims, 5 Drawing Sheets

(51) Int. Cl.

| | | |
|---|---|---|
| *B32B 37/15* | (2006.01) | |
| *B32B 37/08* | (2006.01) | |
| *B32B 37/10* | (2006.01) | |
| *B29C 48/08* | (2019.01) | |
| *B29C 48/00* | (2019.01) | |
| *B29C 48/21* | (2019.01) | |
| *B32B 27/18* | (2006.01) | |
| *B32B 27/32* | (2006.01) | |
| *B29C 65/00* | (2006.01) | |
| *B29C 47/00* | (2006.01) | |
| *B32B 37/12* | (2006.01) | |
| *B29K 23/00* | (2006.01) | |
| *B29K 69/00* | (2006.01) | |
| *B29L 7/00* | (2006.01) | |
| *B29L 9/00* | (2006.01) | |
| *B29L 31/34* | (2006.01) | |

(52) U.S. Cl.
CPC .................. *Y10T 428/31507* (2015.04); *Y10T 428/31786* (2015.04)

(56) References Cited

U.S. PATENT DOCUMENTS

| | | | |
|---|---|---|---|
| 5,260,372 | A | 11/1993 | Toporcer |
| 6,276,104 | B1 * | 8/2001 | Long, Sr. .............. B29C 44/569 428/318.4 |
| 7,564,209 | B2 | 7/2009 | Mochizuki et al. |
| 2002/0128358 | A1 | 9/2002 | Murschall |
| 2003/0114022 | A1 | 6/2003 | Franzen |
| 2004/0066640 | A1 | 4/2004 | Fujii |
| 2004/0247819 | A1 | 12/2004 | Khieu et al. |
| 2006/0011108 | A1 | 1/2006 | Abu-Isa et al. |
| 2006/0110613 | A1 | 5/2006 | Ye et al. |
| 2007/0014978 | A1 | 1/2007 | Poloso |
| 2007/0230156 | A1 | 10/2007 | Chen |
| 2009/0034054 | A1 | 2/2009 | Ikegami |
| 2010/0096181 | A1 | 4/2010 | Nakamura et al. |
| 2010/0282488 | A1 | 11/2010 | Zheng |
| 2011/0236662 | A1 | 9/2011 | Fukuda et al. |

FOREIGN PATENT DOCUMENTS

| | | |
|---|---|---|
| CN | 102171773 A | 8/2011 |
| CN | 103550864 A | 2/2014 |
| DE | 4038827 A1 | 6/1992 |
| EP | 0248208 A2 | 12/1987 |
| EP | 0377513 A2 | 7/1990 |
| EP | 0795399 A1 | 9/1997 |
| JP | H06 79846 A | 3/1994 |
| JP | 2001-71438 A | 9/2002 |
| JP | 2004-98325 A | 10/2005 |
| JP | 2005-335101 A | 12/2005 |
| JP | 2007146049 A1 | 6/2007 |
| JP | 2010278293 | 12/2010 |
| JP | 2011052094 | 3/2011 |
| WO | 2011148330 A1 | 12/2011 |

OTHER PUBLICATIONS

International Search Report for PCT/US2013/071341 dated Feb. 25, 2014, 5 pages.
International Search Report for PCT/US2013/071342 dated Feb. 25, 2014, 5 pages.
International Search Report for PCT/US2013/071343 dated Feb. 25, 2014, 5 pages.
Handbook for Synthetic Resin and Plastics, published by Shanghai Science and Technology Press on Aug. 31, 1993, Yunbiao Gong, et al., pp. 1265-1267.
Engineering Plastics and the Applications Thereof, published by Mechanical Industry Press on Apr. 30, 2006, Xinmin Fan, et al., pp. 210-214.

* cited by examiner

INSULATION FILM AND METHOD FOR MAKING INSULATION FILM

RELATED APPLICATIONS

The present application is a U.S. national phase of PCT International Patent Application No. PCT/US2013/071341, filed Nov. 21, 2013, which claims the priority benefit of Chinese Patent Application Nos. 201210511014.0, filed Dec. 3, 2012, and 201210510162.0, filed Dec. 3, 2012, the contents of all of which are incorporated by reference herein in their entirety.

FIELD OF THE INVENTION

The present invention relates to an insulation film, and particularly to an insulation film made of PP.

BACKGROUND OF THE INVENTION

An insulation film is used to isolate various electronic devices or components to avoid malfunction caused by shortcircuiting, breakdown or the like between the electronic devices or components, or electronic elements in the electronic devices or components, and reduce the risk of catching fire of the electronic devices or components so as to guarantee normal operation of various electronic elements. For example, the insulation film is placed between a printed circuit board (PCB) containing various circuits and a metallic housing such as an aluminum or copper housing for preventing EMI (electromagnetic interference) to prevent problems such as shortcircuiting caused by contact between the various elements on the PCB and the metallic housing. In order to use the insulation film, the insulation film is required to have properties such as flame retardance, resistance against long-term high temperature, resistance against high pressure, inability to absorb water and good foldability. Furthermore, specific indices for the requirements for these properties of the insulation film vary with different requirements for insulation.

To meet the requirements for the properties of the insulation film, conventionally PP, PC and PET having halogenated flame retardants are used to manufacture the insulation film. However, the halogenated flame retardants are harmful for the environment. In order to eliminate the influence on the environment, attempts are made to reduce the amount of halogenated flame retardants used in PP, PC and PET or use PP, PC and PET having halogen-free flame retardants to manufacture the insulation film.

Since the raw material of PP is more inexpensive and exhibits a better folding endurance, insulation films made of PP are used more widely. However, because halogen-free flame retardants applicable to PP are hygroscopic, PP films containing halogen-free retardants are hygroscopic and as a result of which, PP films containing halogen-free retardants have a poor insulating property.

Therefore, it is desired to produce a PP insulting film containing halogenated flame retardants or halogen-free flame retardants which is produced at a lower cost, exhibits a better quality.

SUMMARY OF THE INVENTION

The present invention provides an insulation film, comprising a film upper layer and a film lower layer, wherein both of the film upper layer and film lower layer are made of a PP material, the PP material contains a flame retardant to meet the flame retardance thereof; a film intermediate layer located between the film upper layer and the film lower layer, the film intermediate layer is made of a PP or PE material, the PP or PE material does not contain a flame retardant or contains a small amount of flame retardant; an upper surface of the film intermediate layer is bound together with a lower surface of the film upper layer, a lower surface of the film intermediate layer is bound together with an upper surface of the film lower layer. The film upper layer and the film lower layer are made of like or identical material. The flame retardant in the film upper layer and the film lower layer contains a phosphor-containing flame retardant or a nitrogen-containing flame retardant or a phosphor-nitrogen-containing flame retardant or a silicon-containing flame retardant or a bromine-containing flame retardant or a chlorine-containing flame retardant. The PP in the film upper layer and the film lower layer accounts for 50%-95% of a mass of the film upper layer or film lower layer, and the flame retardant accounts for 5%-50% of the mass of the film upper layer or the film lower layer. The flame retardant in the film intermediate layer contains a phosphor-containing flame retardant or a nitrogen-containing flame retardant or a phosphor-nitrogen-containing flame retardant or a silicon-containing flame retardant or a bromine-containing flame retardant or a chlorine-containing flame retardant, and the mass of flame retardant in the film intermediate layer is less than 25% of a mass of the film intermediate layer. When the thickness of the insulation film is 0.4 mm, after being subjected to pre-treatment of at a temperature 90 and under a 90% RH for 96 hours, the insulation film has a breakdown strength of not less than 20 KVAC/mm. The insulation film having the thickness of 0.4 mm has a foldability of not less than 100 times according to a test method ASTM D2176-97a. The thickness of the film intermediate layer is 5%-45% of the thickness of the insulation film, and the thickness of the film upper layer and the film lower layer is 55%-95% of a total thickness of the insulation film. The total thickness of the insulation film is in a range of 0.05 mm-3.0 mm. The insulation film is formed by processing by a co-extruding process or a composite process.

The present invention further provides a method of producing the insulation film. The method comprises: on a first extruder, extruding PP particles containing the flame retardant to melt them, the PP containing the flame retardant in a molten state flowing out of the first extruder and then through subsequent connecting pipes into a dispenser, the dispenser dividing the PP containing the halogen-free flame retardant in the molten state extruded out of the first extruder into two sections, namely, a first molten PP containing the flame retardant and a second molten PP containing the flame retardant; extruding on a second extruder PP or PE particles not containing a flame retardant or containing a small amount of flame retardant to make them molten, the PP or PE not containing a flame retardant or containing a small amount of flame retardant in the molten state flowing out of the second extruder and then through subsequent connecting pipes into the dispenser, the PP or PE not containing a flame retardant or containing a small amount of flame retardant in the molten state flowing into between the first molten PP containing the flame retardant and the second molten PP containing the flame retardant in the dispenser; the first molten PP containing flame retardant, the PP particles or PE not containing the flame retardant or containing a small amount of flame retardant in the molten state and the second molten PP containing flame retardant being superimposed together and then flowing out of the dispenser, flowing through a die head into a cooling forming roller to be cooled and formed as a sheet/film.

The present invention further provides a method of producing the insulation film. The method comprises: on a first extruder, extruding PP particles containing the flame retardant to melt them to form a first molten PP containing the flame retardant, the first molten PP containing the flame retardant flowing out of the first extruder and then through subsequent connecting pipes into a dispenser; extruding on a third extruder PP particles containing the flame retardant to make them molten to form a second molten PP containing the flame retardant, the second molten PP containing the flame retardant being extruded out of the third extruder and then flowing through subsequent connecting pipes into the dispenser; extruding on a second extruder PP or PE particles not containing a flame retardant or containing a small amount of flame retardant to make them molten, the PP or PE not containing a flame retardant or containing a small amount of flame retardant in the molten state flowing out of the second extruder and then through subsequent connecting pipes into the dispenser, the PP or PE not containing a flame retardant or containing a small amount of flame retardant in the molten state flowing into between the first molten PP containing the flame retardant and the second molten PP containing a flame retardant in the dispenser; the first molten PP containing flame retardant, the PP or PE particles not containing a flame retardant or containing a small amount of flame retardant in the molten state and the second molten PP containing flame retardant being superimposed together and then flowing out of the dispenser, flowing through a die head into a cooling forming roller to be cooled and formed as a sheet/film.

The present invention further provides a method of producing the insulation film. The method comprises: providing the film upper layer and the film lower layer, wherein both of the film upper layer and film lower layer are made of a PP material and the PP material contains a flame retardant to meet the flame retardance thereof; providing an intermediate layer located between the film upper layer and the film lower layer, the film intermediate layer is made of a PP or PE material, the PP or PE material does not contain a flame retardant or contains a small amount of flame retardant; applying a glue to a lower surface of the film upper layer and/or an upper surface of the film intermediate layer, and applying a glue on an upper surface of the film lower layer and/or a lower surface of the film intermediate layer; delivering the film upper layer, film intermediate layer and film lower layer through pressing rollers to be pressed and formed as a sheet/film.

The present invention further provides a method of producing the insulation film. The method comprises: providing the film upper layer and the film lower layer, wherein both of the film upper layer and film lower layer are made of a PP material and the PP material contains a flame retardant to meet the flame retardance thereof; providing an intermediate layer located between the film upper layer and the film lower layer, the film intermediate layer is made of a PP or PE material, the PP or PE material does not contain a flame retardant or contains a small amount of flame retardant; respectively heating the film upper layer, the film intermediate layer and the film lower layer to soften them; delivering the heated and softened film upper layer, film intermediate layer and film lower layer through pressing rollers to be pressed and formed as a sheet/film.

The present invention provides another insulation film, comprising: a film upper layer made of a PP material, wherein the PP material contains a flame retardant to meet the flame retardance thereof; and a film lower layer, wherein the film lower layer is made of a PP or PE material, the PP or PE material does not contain a flame retardant or contains a small amount of flame retardant; a lower surface of the film upper layer is bound together with an upper surface of the film lower layer. The flame retardant in the film upper layer contains a phosphor-containing flame retardant or a nitrogen-containing flame retardant or a phosphor-nitrogen-containing flame retardant or a silicon-containing flame retardant or a bromine-containing flame retardant or a chlorine-containing flame retardant. The PP in the film upper layer accounts for 50%-95% of a mass of the film upper layer, and the flame retardant accounts for 5%-50% of the mass of the film upper layer. The flame retardant in the film lower layer contains a phosphor-containing flame retardant or a nitrogen-containing flame retardant or a phosphor-nitrogen-containing flame retardant or a silicon-containing flame retardant or a bromine-containing flame retardant or a chlorine-containing flame retardant, and the mass of flame retardant in the film lower layer is less than 25% of a mass of the film lower layer. The total thickness of the insulation film is in a range of 0.05 mm-3.0 mm. The insulation film is formed by processing by a co-extruding process or a composite process.

The present invention further provides an insulation film, comprising two PP layers containing the flame retardant and one PP or PE layer not containing a flame retardant or only containing a small amount of flame retardant, wherein the two PP layers containing the flame retardant are respectively bound together with an upper surface and a lower surface of the PP or PE layer not containing a flame retardant or only containing a small amount of flame retardant. The flame retardant in the PP layers containing the flame retardant contains a phosphor-containing flame retardant or a nitrogen-containing flame retardant or a phosphor-nitrogen-containing flame retardant or a silicon-containing flame retardant or a bromine-containing flame retardant or a chlorine-containing flame retardant. The PP accounts for 50%-95% of a mass of the PP layers containing the flame retardant, and the flame retardant accounts for 5%-50% of the mass of the PP layers containing the flame retardant. The flame retardant in the PP or PE layer not containing a flame retardant or only containing a small amount of flame retardant contains a phosphor-containing flame retardant or a nitrogen-containing flame retardant or a phosphor-nitrogen-containing flame retardant or a silicon-containing flame retardant or a bromine-containing flame retardant or a chlorine-containing flame retardant. The mass of flame retardant in the PP or PE layer not containing a flame retardant or only containing a small amount of flame retardant is less than 25% of a mass of the PP or PE layer not containing a flame retardant or only containing a small amount of flame retardant. When the thickness of the insulation film is 0.4 mm, after being subjected to pre-treatment of at a temperature 90 and under a 90% RH for 96 hours, the insulation film has a breakdown strength of not less than 20 KVAC/mm. The insulation film having a thickness of 0.4 mm has a foldability of not less than 100 times according to a test method ASTM D2176-97a. The thickness of the PP or PE layer not containing a flame retardant or only containing a small amount of flame retardant is 5%-45% of the thickness of the insulation film, and a total of the thickness of the two PP layers containing a flame retardant is 55%-95% of a total thickness of the insulation film. The total thickness of the insulation film is in a range of 0.05 mm-3.0 mm. The insulation film is formed by processing by a co-extruding process or a composite process.

DETAILED DESCRIPTION OF PREFERRED EMBODIMENTS

Figure 1:
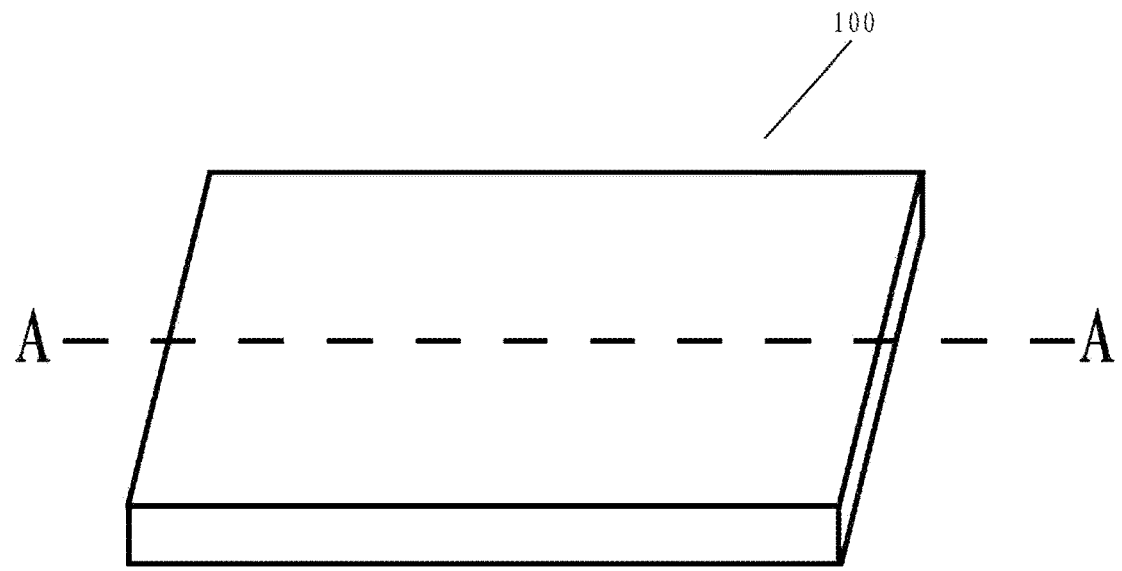
FIG. 1 is a schematic view of a PP film containing a retardant according to an embodiment of the present invention.
Figure 2:
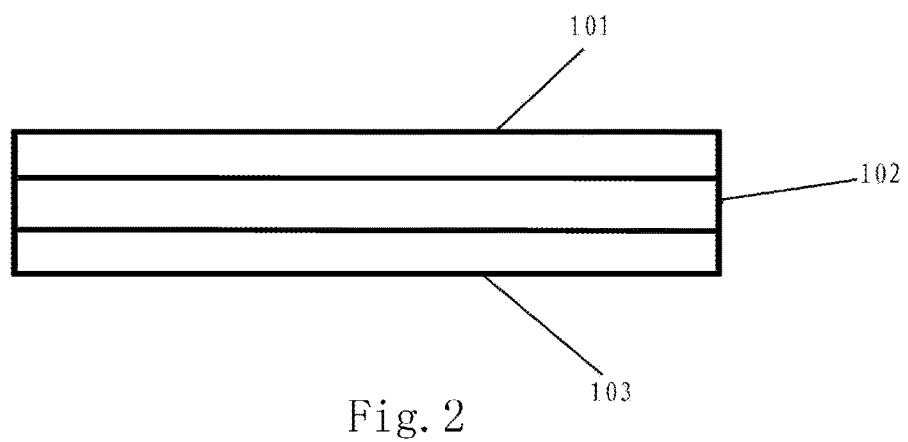
FIG. 2 is a cross-sectional view of the PP film containing a retardant of FIG. 1 taken along the line A-A in FIG. 1.

FIG. 1 illustrates a schematic view of an insulation film 100 according to an embodiment of the present invention. According to one embodiment of the present invention, the insulation film 100 has a thickness of 0.05 mm-3.0 mm FIG. 2 is a cross-sectional view of the insulation film 100 of FIG. 1 taken along the line A-A in FIG. 1. As shown in FIG. 2, the insulation film 100 comprises an upper layer 101, an intermediate layer 102 and a lower layer 103. According to an embodiment of the present invention, a thickness of the upper layer 101 and the lower layer 103 of the insulation film is 55%-95% of the thickness of the insulation film, and a thickness of the intermediate layer of the insulation film is 5%-45% of the thickness of the insulation film. If the thickness of the intermediate layer of the insulation film is beyond 45% of the thickness of the insulation film, the flame retardance property of the insulation film cannot be guaranteed. If the thickness of the intermediate layer of the insulation film is below 5% of the thickness of the insulation film, the insulation film cannot meet the requirement for insulating property after the insulation film absorbs humidity, the cost of the insulation film cannot be considerably reduced and the intermediate layer is prone to be distributed unevenly.

The upper layer 101 and the lower layer 103 of the insulation film 100 are made of PP containing a flame retardant. The flame retardant in the upper layer 101 and the lower layer 103 of the insulation film 100 comprises a halogen-free flame retardant or halogenated flame retardant. The halogen-free flame retardant includes a phosphor-containing flame retardant or a nitrogen-containing flame retardant or a phosphor-nitrogen-containing flame retardant or a silicon-containing flame retardant and the halogenated flame retardant includes a bromine-containing flame retardant or a chlorine-containing flame retardant. According to an embodiment of the present invention, a mass of the flame retardant in the upper layer 101 and the lower layer 103 of the insulation film 100 is 5%-50% of a mass of the upper layer 101 or the lower layer 103 of the insulation film and a mass of the PP material in the upper layer 101 and the lower layer 103 of the insulation film 100 is 50%-95% of a mass of the upper layer 101 or the lower layer 103 of the insulation film. The content of the flame retardant in PP can meet the requirements for the flame retardance of the insulation film 100. The intermediate layer 102 of the insulation film 100 is made of PP or PE not containing a flame retardant or containing a small amount of flame retardant. Since the PP or PE of the intermediate layer 102 of the film does not contain a halogenated flame retardant or halogen-free flame retardant or only contains a small amount of halogenated flame retardant or halogen-free flame retardant, the insulation film of the present invention uses less flame retardant and thus the cost of the insulation film is reduced. And since the PP or PE of the intermediate layer 102 of the film does not contain a halogen-free flame retardant or only contains a small amount of halogen-free flame retardant, the intermediate layer of the film has a property of not absorbing water. When the PP or PE of the intermediate layer 102 of the film contains a small amount of flame retardant, the flame retardant comprises a halogen-free flame retardant or halogenated flame retardant. The halogen-free flame retardant can comprise a phosphor-containing flame retardant, a nitrogen-containing flame retardant, a phosphor-nitrogen-containing flame retardant or a silicon-containing flame retardant and the halogenated flame retardant includes a bromine-containing flame retardant or a chlorine-containing flame retardant. The mass of the flame retardant is less than 25% of the mass of the intermediate layer of the film.

The insulting film 100 of the present invention has the following advantages:

When a halogen-free flame retardant which is more environmentally friendly is used, because the intermediate layer 102 of the insulation film does not contain the halogen-free flame retardant or only contains a small amount of halogen-free flame retardant, the insulation film 100 of the present invention has a property of not easily absorbing water so as to improve a breakdown strength of the PP insulation film containing the halogen-free flame retardant. It is found after experiments that when the insulting film 100 of the present invention has a thickness of 0.4 mm, after being subjected to pre-treatment at a temperature of and under a 90% RH (relative humidity) for 96 hours, the insulation film has the breakdown strength of not less than 20 KVAC/mm. By using the same testing conditions and method, it is found that the PP insulation film 100 containing the halogen-free flame retardant according to the present invention has a breakdown voltage substantially higher than that of the conventional PP insulation film containing the halogen-free flame retardant. For example, the conventional PP insulation film containing the halogen-free flame retardant that has the flammability of V-0 and has the thickness of 0.4 mm and the PP insulation film 100 containing the halogen-free flame retardant that has the flammability of V-0 and has the thickness of 0.4 mm according to the present invention are placed at a temperature of 90 and under a 90% RH (relative humidity) for 96 hours (for absorbing humidity), immediately after which they are subjected to a 5 KVAC voltage withstanding test (at a voltage rise speed of 0.5 KVAC/second; the voltage remains for 60 seconds after it reaches 5 KVAC), and then the breakdown voltage is tested by the method ASTM D-149 (pretreatment is not performed any more). The conventional PP insulation film containing the halogen-free flame retardant that has the flammability of V-0 and has the thickness of 0.4 mm has a voltage withstanding performance of 4-5 KVAC after humidity absorption and a breakdown voltage of about 8 KVAC while the PP insulation film 100 containing the halogen-free flame retardant that has the flammability of V-0 and has the thickness of 0.4 mm according to the present invention has a voltage withstanding performance of 8 KVAC after humidity absorption and a breakdown voltage of 12 KVAC.

Furthermore, because the flame retardant has a higher flame retardant efficiency in the surface layers (upper layer and the lower layer) of the film than in the interior (intermediate layer) of the film, no matter whether the halogenated flame retardant or halogen-free flame retardant is used in the film of the present invention, the film of the present invention has a same flame retardant property as a single layer film has with using less flame retardant. Since flame retardants are expensive, the cost of the insulation film of the present invention is reduced.

In addition, the PP insulation film 100 containing the flame retardant according to the present invention may maintain the excellent properties of the PP raw material very well. For example, it is found after experiments that PP insulation film 100 having the thickness of 0.4 mm according to the present invention has a foldability of not less than 100 times under the test method of ASTM D2176-97a. It can be seen that in the PP insulation film containing the flame retardant according to the present invention, the excellent folding endurance of the PP raw material is retained.

Furthermore, the Inventor found that the current regulatory standards (e.g., the international standard UL-60950 or IEC-60950) for the insulation film requires at least a thickness of 0.4 mm for a single-layered insulation film made of a homogeneous material if supplementary insulation or reinforced insulation is required for the single-layered insulation film. However, the UL standard does not impose such requirement of thickness for a multi-layered insulation film comprising inseparable layers, but the UL standard requires the voltage resistance of the multi-layered insulation film comprising inseparable layers to increase by 50%~100% and requires the multi-layered insulation film comprising inseparable layers to pass the additional Mandrel test. That is to say, even if a multi-layered insulation film comprising inseparable layers has a thickness of less than 0.4 mm, it is considered as meeting the regulatory standards so long as it passes the stricter voltage withstanding test and the additional Mandrel test. The insulation film of the present invention is a multi-layered insulation film having inseparable multiple layers which are made of different materials, and it is found after experiments that the material for the insulation film of the present invention can exactly pass the stricter voltage withstanding test and the additional Mandrel test. Therefore, to meet the requirement under the regulatory standards, the thickness of the insulation film may be less than 0.4 mm. In other words, as compared with the conventional single-layered insulation film containing the flame retardant, the PP insulation film containing the flame retardant according to the present invention has a reduced thickness, for example, the thickness of the insulation film can be reduced from 0.43 mm to 0.25 mm or thinner, while the insulation film according to the present invention can pass the stricter voltage withstanding test and the additional Mandrel test, thereby saving the material and cutting the production costs.

Finally, when a halogen-free flame retardant is used, because of containing a very large amount of halogen-free flame retardant, the conventional PP insulation film containing the halogen-free flame retardant causes an undesirable extensibility of the material and is likely to form micropores due to tensile fracture during an extruding casting procedure. However, having the PP layer not containing the halogen-free flame retardant or only containing a small amount of halogen-free flame retardant, the PP insulation film containing the halogen-free flame retardant according to the present invention has a reduced content of the halogen-free additive in the insulation film, thereby reducing a probability of forming micropores in the insulation film.

Figure 3:
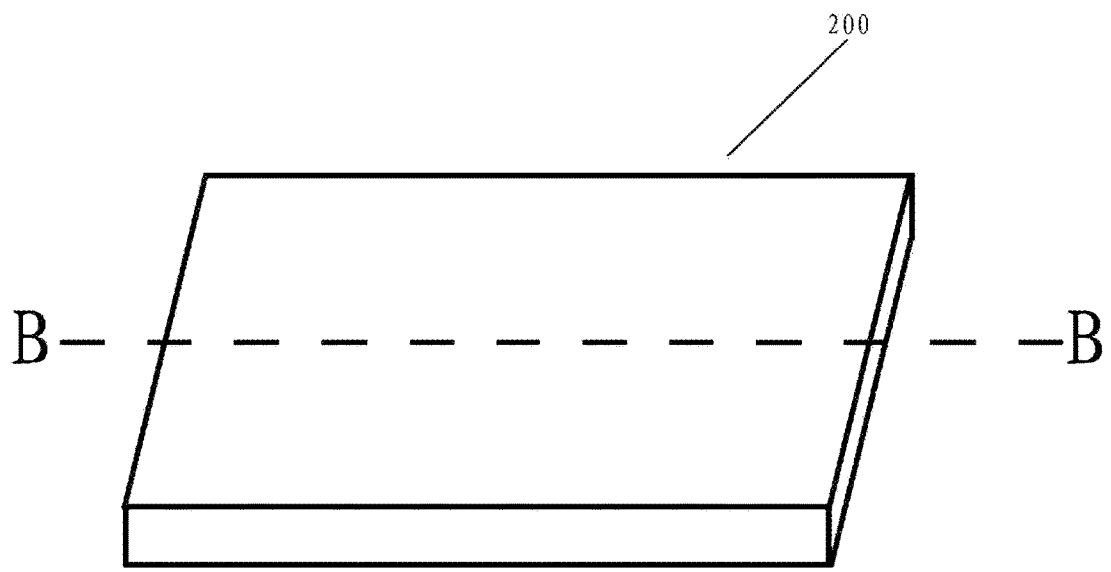
FIG. 3 is a schematic view of a PP film containing a retardant according to another embodiment of the present invention.
Figure 4:
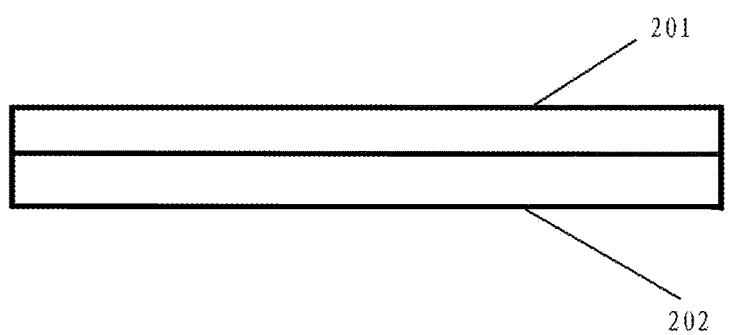
FIG. 4 is a cross-sectional view of the PP film containing a retardant of FIG. 3 taken along the line B-B in FIG. 3.

FIG. 3 is a schematic view of a film 200 according to another embodiment of the present invention. The only difference between the insulation film 200 and the insulation film 100 in FIG. 1 lies in that the insulation film 200 has a structure of two layers, wherein one layer is made of PP containing a flame retardant and the other layer is made of PP or PE not containing a flame retardant or only containing a small amount of flame retardant. FIG. 4 is a cross-sectional view taken along a line B-B of FIG. 3 to illustrate the structure of the insulation film 200 having two layers (201, 202). The two-layered insulation film shown in FIG. 3 and FIG. 4 also has the PP or PE layer not containing a flame retardant or only containing a small amount of flame retardant, and therefore has the same advantages of the insulation film shown in FIG. 1 and FIG. 2. Certainly, the principles of the present invention also apply to other multi-layered insulation films made of different materials.

Figure 5:
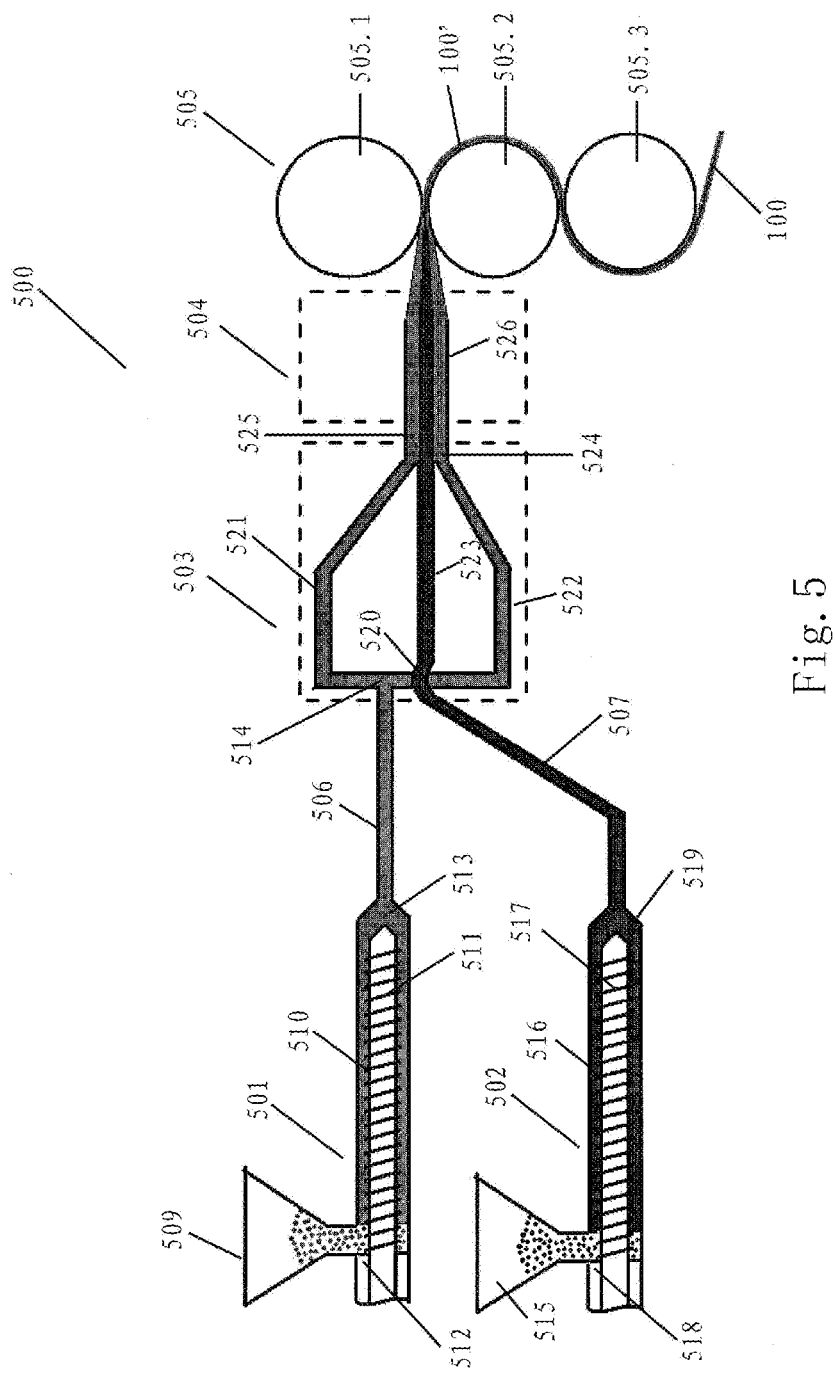
FIG. 5 is an exemplary view of a co-extruding process for producing the insulation film according to an embodiment of the present invention.

FIG. 5 illustrates a co-extruding assembly line 500 of a co-extruding process for producing the insulation film 100 according to an embodiment of the present invention. As shown in FIG. 5, the co-extruding assembly line 500 comprises a first extruder 501 and a second extruder 502. The first extruder 501 comprises a feeding hopper 509 and a receiving cavity 510. The feeding hopper 509 is configured to receive PP particles containing the flame retardant. The receiving cavity 510 is provided with a driving screw 511. An outlet of the feeding hopper 509 is communicated with a front end inlet 512 of the receiving cavity 510, a rear end outlet 513 of the receiving cavity 510 is communicated with an inlet of a pipe 506, and an outlet of the pipe 506 is communicated with a first inlet 514 of a dispenser 503. The second extruder 502 comprises a feeding hopper 515 and a receiving cavity 516. The feeding hopper 515 is configured to receive PP or PE particles not containing a flame retardant or containing a small amount of flame retardant. The receiving cavity 516 is provided with a driving screw 517. An outlet of the feeding hopper 515 is communicated with a front end inlet 518 of the receiving cavity 516, a rear end outlet 519 of the receiving cavity 516 is communicated with an inlet of a pipe 507, and an outlet of the pipe 507 is communicated with a second inlet 520 of the dispenser 503.

The first inlet 514 of the dispenser 503 is communicated with an inlet of a first branch line 521 and an inlet of the second branch line 522 of the dispenser, and the second inlet 520 of the dispenser 503 is communicated with an inlet of a third branch line 523 of the dispenser. As shown in FIG. 5, the third branch line 523 is located between the first branch line 521 and the second branch line 522. An outlet of the first branch line 521, an outlet of the second branch line 522 and an outlet of the third branch line 523 converge at an outlet 524 of the dispenser. The outlet 524 of the dispenser is connected to an inlet of a conduit 525, and an outlet of the conduit 525 is communicated with an inlet of a die cavity 526 of a die head 504. The die cavity 526 of the die head 504 has an appropriate width and depth so that the die cavity is sufficient to receive a material delivered from the pipe of the dispenser, and the die cavity 526 is flat so that the material delivered from the pipe of the dispenser is die pressed into a flat shape therein. The die pressed material is delivered through an outlet of the die cavity 526 to a forming roller apparatus 505. The forming roller apparatus 505 comprises a plurality of forming rollers placed adjacent to one another. The material delivered from the die cavity of the die head to the forming roller apparatus is stretched, roll pressed and cooled between the plurality of forming rollers to achieve a desired thickness and form a sheet material. FIG. 5 shows three such forming rollers 505.1, 505.2 and 505.3. Two or more forming rollers may be used in other embodiments.

According to the co-extruding assembly line 500 shown in FIG. 5, the insulation film 100 according to the present invention is produced in the following procedure:

During production, the receiving cavities 510 and 516 of the first extruder 501 and the second extruder 502 are heated, and the driving screws 511 and 517 of the first extruder 501 and the second extruder 502 are rotated.

The PP particles containing the flame retardant are fed to the feeding hopper 509 of the first extruder 501. The rotation of the driving screw 511 of the first extruder 501 pushes the PP particles containing the flame retardant in the feeding hopper 509 into the receiving cavity 510. Since the receiving cavity 510 is heated, the PP particles containing the flame retardant, after entry into the receiving cavity 510, are melted due to heat generated from friction and are in a molten state. Affected by the pushing force generated by rotation of the driving screw 511, the PP containing the flame retardant in the molten state is delivered to the rear end outlet 513 of the receiving cavity 510. The pushing force generated by rotation of the driving screw 511 enables the PP containing the flame retardant in the molten state to flow out of the receiving cavity 510 from the rear end outlet 513 of the receiving cavity 510, and then enters the pipe 506 through the inlet of the pipe 506 communicated with the rear end outlet 513 of the receiving cavity 510. The PP containing the flame retardant in the molten state flows out through the outlet of the pipe 506 to the first inlet 514 of the dispenser 503. At the inlet 514 of the dispenser, the PP containing the flame retardant in the molten state is divided into two flows: one enters the first branch line 521 of the dispenser to become a first molten PP containing flame retardant, and the other enters the second branch line 522 of the dispenser to become a second molten PP containing flame retardant.

Similarly, the PP or PE particles not containing a flame retardant or only containing a small amount of flame retardant are fed to the feeding hopper 515 of the second extruder 502. The rotation of the driving screw 517 of the second extruder 502 pushes the PP or PE particles not containing a flame retardant or only containing a small amount of flame retardant in the feeding hopper 515 into the receiving cavity 516. Since the receiving cavity 516 is heated, the PP or PE not containing a flame retardant or only containing a small amount of flame retardant, after entry into the receiving cavity 516, are melted due to heat generated from friction and are in a molten state. Affected by the pushing force generated by rotation of the driving screw 517, the PP or PE not containing a flame retardant or only containing a small amount of flame retardant in the molten state is delivered to the rear end outlet 519 of the receiving cavity 516. The pushing force generated by rotation of the driving screw 517 enables the PP or PE not containing a flame retardant or only containing a small amount of flame retardant in the molten state to flow out of the receiving cavity 516 from the rear end outlet 519 of the receiving cavity 516, and then enters the pipe 507 through the inlet of the pipe 507 communicated with the rear end outlet 519 of the receiving cavity 516. The PP or PE not containing a flame retardant or only containing a small amount of flame retardant in the molten state flows out through the outlet of the pipe 507 to the second inlet 520 of the dispenser 503, and enters the third branch line 523 of the dispenser via the second inlet 503. Noticeably, the operation for the PP or PE particles not containing a flame retardant or only containing a small amount of flame retardant is performed at the same time as the previously-described operation for the PP containing the flame retardant.

The first molten PP containing flame retardant entering the first branch line 521 of the dispenser 503, the PP or PE particles not containing a flame retardant or only containing a small amount of flame retardant in the molten state entering the third branch line 522 of the dispenser 503 and the second molten PP containing flame retardant entering the second branch line 523 of the dispenser 503 converge at the outlet 524 of the dispenser to thereby superimpose together, and then enters the die cavity 526 of the die head 504 via the conduit 525 communicated with the outlet 524 of the dispenser so that the molten PP is die pressed in the die cavity 526 to form a flat molten mass. The die pressed flat molten mass is delivered to between the forming rollers 505.1 and 505.2 to receive a stretching and pressing force applied by the forming rollers 505.1 and 505.2 thereto, and meanwhile it is cooled by the forming rollers 505.1 and 505.2 to thereby form a sheet or film 100' with a predetermined thickness. The film 100' continued to be fed between the forming rollers 505.2 and 505.3 for further cooling or annealing to form the insulation film or sheet 100 according to one embodiment of the present invention. As needed, the die pressed flat molten mass outputted from the die head may run through only two forming rollers or more than two forming rollers to form the film.

Figure 6:
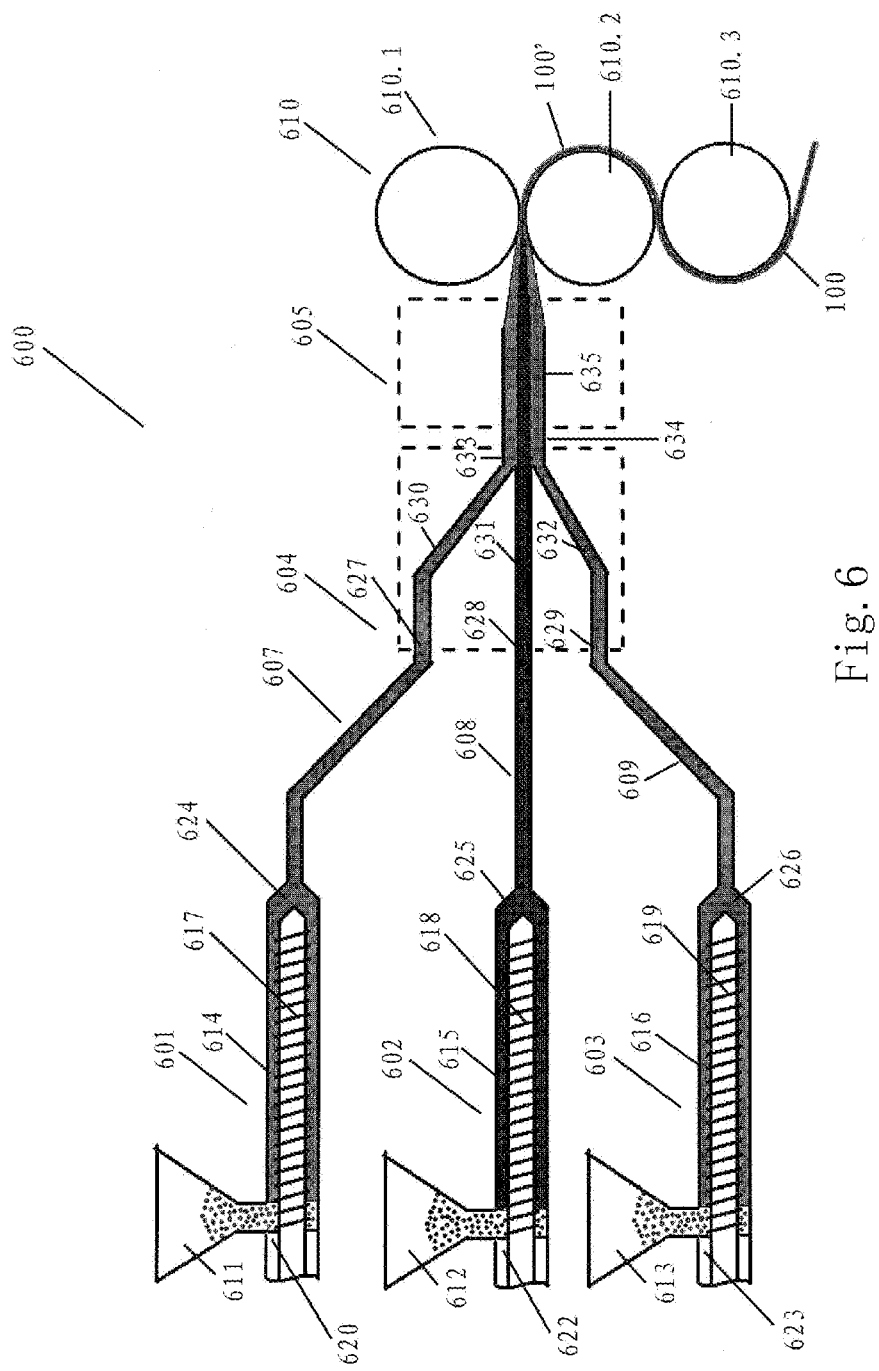
FIG. 6 is an exemplary view of another co-extruding process for producing the insulation film according to an embodiment of the present invention.

FIG. 6 illustrates a co-extruding assembly line 600 of another co-extruding process for producing the insulation film 100 according to an embodiment of the present invention. As shown in FIG. 6, the co-extruding assembly line 600 comprises a first extruder 601, a second extruder 602 and a third extruder 603. The first extruder 601, the second extruder 602 and the third extruder 603 respectively comprise a feeding hopper 611, 612, 613, a receiving cavity 614, 615, 616 and a driving screw 617, 618 and 619. The feeding hoppers of the first and third extruders 611 and 613 are configured to receive PP particles containing the flame retardant. The feeding hopper of the second extruder 612 is configured to receive the PP or PE particles not containing a flame retardant or only containing a small amount of flame retardant. An outlet of the feeding hopper 611 of the first extruder 601 is communicated with a front end inlet 620 of the receiving cavity 614, a rear end outlet 624 of the receiving cavity 614 is communicated with an inlet of a pipe 607, and an outlet of the pipe 607 is communicated with a first inlet 627 of a dispenser 604. Similarly, an outlet of the feeding hopper 612 of the second extruder 602 is communicated with a front end inlet 622 of the receiving cavity 615, a rear end outlet 625 of the receiving cavity 615 is communicated with an inlet of a pipe 608, and an outlet of the pipe 608 is communicated with a second inlet 628 of the dispenser 604. An outlet of the feeding hopper 613 of the third extruder 603 is communicated with a front end inlet 623 of the receiving cavity 616, a rear end outlet 626 of the receiving cavity 616 is communicated with an inlet of a pipe 609, and an outlet of the pipe 609 is communicated with a third inlet 629 of the dispenser 604.

The first inlet 627 of the dispenser 604 is communicated with an inlet of a first branch line 630 of the dispenser, a second inlet 628 of the dispenser 604 is communicated with an inlet of a second branch line 631 of the dispenser, and a third inlet 629 of the dispenser 604 is communicated with an inlet of the of the third branch line 632 of the dispenser. As shown in FIG. 6, the second branch line 631 is located between the first branch line 630 and the third branch line 623. An outlet of the first branch line 630, an outlet of the second branch line 631 and an outlet of the third branch line 632 converge at an outlet 633 of the dispenser. The outlet 633 of the dispenser is communicated with an inlet of a conduit 634, and an outlet of the conduit 634 is communicated with an inlet of a die cavity 635 of a die head 605. The die cavity 635 of the die head 605 has an appropriate width and depth so that the die cavity is sufficient to receive a material delivered from the pipe of the dispenser, and the die cavity 635 is flat so that the material delivered from the pipe of the dispenser is die pressed into a flat shape therein. The die pressed material is delivered through an outlet of the die cavity 635 to a forming roller apparatus 610. The forming roller apparatus 610 comprises a plurality of forming rollers placed adjacent to one another. The material delivered from the die cavity of the die head to the forming roller apparatus is stretched, roll pressed and cooled between the plurality of forming rollers to achieve a desired thickness and form a sheet material. FIG. 6 shows three such forming rollers 610.1, 610.2 and 610.3. Two or more forming rollers may be used in other embodiments.

According to the co-extruding assembly line 600 shown in FIG. 6, the insulation film 100 according to the present invention is produced in the following procedure:

During production, the receiving cavities 614, 615 and 616 of the first extruder 601, the second extruder 602 and the third extruder 603 are heated, and the driving screws 617, 618 and 619 of the first extruder 601, the second extruder 602 and the third extruder 603 are rotated.

The PP particles containing the flame retardant are fed to the feeding hopper 611 of the first extruder 601. The rotation of the driving screw 617 of the first extruder 601 pushes the PP particles containing the flame retardant in the feeding hopper 611 into the receiving cavity 614. Since the receiving cavity 614 is heated, the PP particles containing the flame retardant, after entry into the receiving cavity 614, are melted due to heat generated from friction and are in a molten state. Affected by the pushing force generated by rotation of the driving screw 617, the PP containing the flame retardant in the molten state is delivered to the rear end outlet 624 of the receiving cavity 614. The pushing force generated by rotation of the driving screw 617 enables the PP containing the flame retardant in the molten state to flow out of the receiving cavity 614 from the rear end outlet 624 of the receiving cavity 614, and then enters the pipe 607 through the inlet of the pipe 607 communicated with the rear end outlet 624 of the receiving cavity 614. The PP containing the flame retardant in the molten state flows out through the outlet of the pipe 607 to the first inlet 627 of the dispenser 604, and enters the first branch line 630 of the dispenser 604. The PP containing the flame retardant entering the first branch line 630 of the dispenser 604 is a first molten PP containing the flame retardant.

Similarly, the PP particles containing the flame retardant are fed to the feeding hopper 613 of the third extruder 603. The PP particles containing the flame retardant are delivered into the third branch line 632 of the dispenser 604 in the same manner as the PP particles containing the flame retardant in the feeding hopper 611 of the first extruder 601, and the PP containing the flame retardant entering the third branch line 632 of the dispenser 604 is a second molten PP containing the flame retardant.

The PP or PE particles not containing a flame retardant or only containing a small amount of flame retardant are fed to the feeding hopper 612 of the second extruder 602. The PP or PE particles not containing a flame retardant or only containing a small amount of flame retardant are delivered into the second branch line 631 of the dispenser 604 in the same manner as the PP particles containing the flame retardant in the feeding hopper 611 of the first extruder 601.

Noticeably, operation is performed at the same time for delivering the PP or PE particles not containing a flame retardant or only containing a small amount of flame retardant respectively to the first branch line 630, the second branch line 631 and the third branch line 632.

Similar to the extruding process in the assembly line shown in FIG. 5, the first molten PP containing the flame retardant entering the first branch line 630 of the dispenser 604, the PP or PE not containing a flame retardant or only containing a small amount of flame retardant in the molten state entering the second branch line 631 of the dispenser 604 and the third molten PP containing flame retardant entering the third branch line 632 of the dispenser converge at the outlet 633 of the dispenser to thereby superimpose together, and then enters the die cavity 635 of the die head 605 via the conduit 634 communicated with the outlet 633 of the dispenser so that the molten PP is die pressed in the die cavity 635 to form a flat molten mass. The die pressed flat molten mass is delivered to between the forming rollers 610.1 and 610.2 to receive a stretching and pressing force applied by the forming rollers 610.1 and 610.2 thereto, to thereby form a sheet or film 100' with a predetermined thickness. The film 100' continued to be fed between the forming rollers 610.2 and 610.3 for further cooling or annealing to form the insulation film or sheet 100 according to one embodiment of the present invention. As needed, the die pressed flat molten mass outputted from the die head may run through only two forming rollers or more than two forming rollers to form the film.

Before the invention, there is not a precedent that the co-extruding process is used for producing the insulation film. Conventionally, the thickness of the intermediate layer of the product produced by the co-extruding process accounts for a relatively high percentage of the total thickness of the product. In the insulation film produced by the co-extruding process according to the present invention, the thickness of the intermediate layer accounts for a relatively low percentage of the total thickness of the insulation film, namely, only 5%-45% of the total thickness of the insulation film. By employing the co-extruding process of the present invention, the respective layers can still be evenly distributed under the circumstances that the thickness of the intermediate layer accounts for a relatively low percentage of the total thickness of the insulation film.

In the co-extruding production process shown in FIG. 5 and FIG. 6, the first molten PP containing the flame retardant, the PP or PE not containing a flame retardant or only containing a small amount of flame retardant in the molten state, and the second molten PP containing the flame retardant are superimposed in the dispenser. However, those skilled in the art should appreciate that the first molten PP containing the flame retardant, the PP or PE not containing a flame retardant or only containing a small amount of flame retardant in the molten state, and the second molten PP containing the flame retardant may also be superimposed in the die head.

The insulation film produced by the co-extruding process is of high quality, but the co-extruding process imposes high requirements for the apparatus. Therefore, the present invention further provides a method of producing the insulation film by a composite process, which imposes lower requirements for the apparatus.

Figure 7:
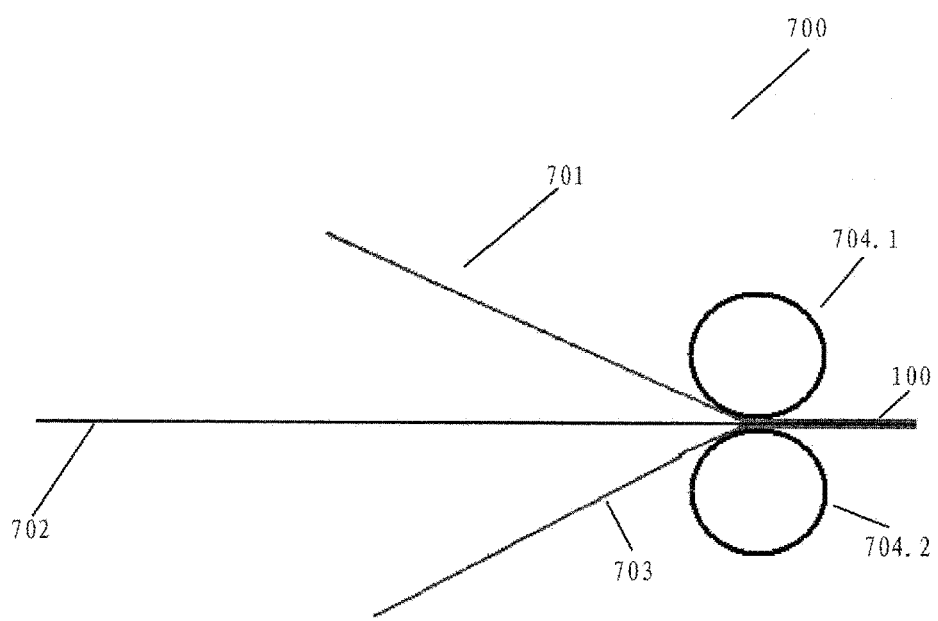
FIG. 7 is an exemplary view of a composite process for producing the insulation film according to an embodiment of the present invention.

FIG. 7 is a composite assembly line 700 of a composite process for producing the insulation film 100 according to an embodiment of the present invention, comprising a pair of pressing rollers 704.1 and 704.2. An upper layer 701, an intermediate layer 702 and a lower layer 703 of the insulation film 100 are respectively wound on three delivery rollers (not shown), and meanwhile inputted between the pressing rollers 704.1 and 704.2. When the pressing rollers 704.1 and 704.2 rotate relative to each other, a pulling force will be generated for the upper layer 701, the intermediate layer 702 and the lower layer 703 so that the delivery rollers are moved to release the upper layer 701, the intermediate layer 702 and the lower layer 703 respectively for the pressing rollers 704.1 and 704.2. As such, the upper layer 701, the intermediate layer 702 and the lower layer 703 are wound between and run through between the pressing rollers 704.1 and 704.2 so that the upper layer 701, the intermediate layer 702 and the lower layer 703 are pressed to form the insulation film 100.

In FIG. 7, the upper layer 701 and the lower layer 703 of the insulation film 100 is made of PP material containing the flame retardant, and the intermediate layer 702 of the insulation film 100 is the PP or PE material not containing a flame retardant or only containing a small amount of flame retardant. After the upper layer 701, the intermediate layer 702 and the lower layer 703 of the insulation film 100 are released from respective delivery rollers and before they are wound between and run through the pressing rollers 704.1 and 704.2, a glue is applied to a lower surface of the upper layer 701 and/or an upper surface of the intermediate layer 702, and a glue is applied on a lower surface of the intermediate layer 702 and/or an upper surface of the lower layer 703 so that the upper layer 701, the intermediate layer 702 and the lower layer 703 of the insulation film 100 are, after being pressed by the pressing rollers 704.01 and 704.02, adhered together to form the insulation film 100.

Figure 8:
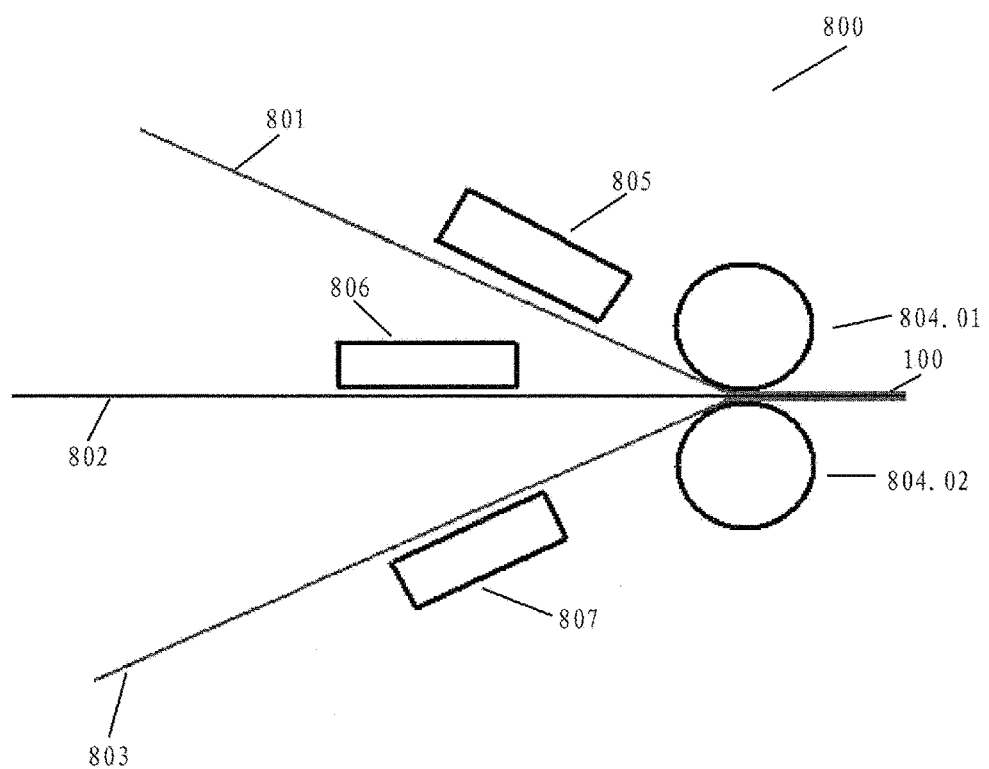
FIG. 8 is an exemplary view of a composite process for producing the insulation film according to an embodiment of the present invention.

FIG. 8 is another composite assembly line 800 of a composite process for producing the insulation film 100 according to an embodiment of the present invention. The composite assembly line 800 in FIG. 8 is similar to the composite assembly line 700 of FIG. 7. The only difference there between is that in FIG. 8, a baker 805, 806 and 807 is respectively provided on one side of a path from the respective delivery rollers for an upper layer 801, an intermediate layer 802 and a lower layer 803 of the insulation film 100 to between pressing rollers 804.01 and 804.02.

In FIG. 8, after the upper layer 801, the intermediate layer 802 and the lower layer 803 of the insulation film 100 are released from respective delivery rollers and before they are wound between and run through the pressing rollers 804.1 and 804.2, the upper layer 801, the intermediate layer 802 and the lower layer 803 of the insulation film 100 are heated by the respective bakers to soften them so that the upper layer 801, the intermediate layer 802 and the lower layer 803 of the softened insulation film 100 are, after being pressed by the pressing rollers 804.01 and 804.02, adhered together to form the insulation film 100.

Although FIG. 8 only illustrates a method of heating the upper layer 801, the intermediate layer 802 and the lower layer 803 of the insulation film via the bakers, those skilled in the art should appreciate that the upper layer 801, the intermediate layer 802 and the lower layer 803 are softened in other manners to soften them.

It should be noted that any one value in the ranges of the values indicated in the present application is applicable to the present invention.

Although the description illustrates, describes and points out novel features of the present invention applicable to preferred embodiments of the present invention, it should be appreciated that without departing from the spirit of the present invention, those skilled in the art may omit, substitute or change the form and details of the illustrated apparatus and its operation. For example, it is particularly noticeable that combinations of those elements and/or steps of the method for performing the substantially the same functions in substantively same manners to achieve the same result fall within the scope of the present invention. Besides, it should be appreciated that the forms disclosed in the present invention or structures and/or members and/or steps of the method shown and/or described in the embodiments might, as options of design, be combined into other forms or embodiments. Therefore, the scope of the present invention is only limited to the scope as defined by the appended claims.

What is claimed is:
1. An insulation film, comprising:
a film upper layer and a film lower layer, wherein both of the film upper layer and film lower layer are made of a PP material, and the PP material contains a flame retardant to meet the flame retardance thereof;
a film intermediate layer located between the film upper layer and the film lower layer, wherein the film intermediate layer is made of a PP material, the PP material does not contain a flame retardant or contains a small amount of flame retardant;
an upper surface of the film intermediate layer is bound together with a lower surface of the film upper layer, and a lower surface of the film intermediate layer is bound together with an upper surface of the film lower layer.

2. The insulation film according to claim 1, wherein the film upper layer and the film lower layer are made of similar or same material.

3. The insulation film according to claim 1, wherein the flame retardant in the film upper layer and the film lower layer comprises a halogen-free flame retardant or halogenated flame retardant, the halogen-free flame retardant includes a phosphor-containing flame retardant, a nitrogen-containing flame retardant, a phosphor-nitrogen-containing flame retardant or a silicon-containing flame retardant and the halogenated flame retardant includes a bromine-containing flame retardant or a chlorine-containing flame retardant.

4. The insulation film according to claim 3, wherein the PP in the film upper layer and the film lower layer accounts for 50-95 of a mass of the film upper layer or film lower layer, and the flame retardant accounts for 5-50 of the mass of the film upper layer or the film lower layer.

5. The insulation film according to claim 1, wherein the flame retardant in the film intermediate layer comprises a halogen-free flame retardant or halogenated flame retardant, the halogen-free flame retardant includes a phosphor-containing flame retardant, a nitrogen-containing flame retardant, a phosphor-nitrogen-containing flame retardant or a silicon-containing flame retardant and the halogenated flame retardant includes a bromine-containing flame retardant or a chlorine-containing flame retardant.

6. The insulation film according to claim 5, wherein the mass of flame retardant in the film intermediate layer is less than 25% of a mass of the film intermediate layer.

7. The insulation film according to claim 1, wherein when the thickness of the insulation film is 0.4 mm, after being subjected to pre-treatment at a temperature 90 and under a 90% RH for 96 hours, the insulation film has a breakdown strength of not less than 20 KVAC/mm.

8. The insulation film according to claim 1, wherein the insulation film having a thickness of 0.4 mm has a foldability of not less than 100 times under a test method of ASTM D2176-97a.

9. The insulation film according to claim 1, wherein the thickness of the film intermediate layer is 5%-45% of the thickness of the insulation film, and the thickness of the film upper layer and the film lower layer is 55%-95% of a total thickness of the insulation film.

10. The insulation film according to claim 1, wherein the insulation film is formed by a co-extruding process or a composite process.

11. The insulation film according to claim 1, wherein the total thickness of the insulation film is in a range of 0.05 mm-3.0 mm.

12. The insulation film of claim 1, wherein the total thickness of the insulation film is in a range of 0.05 mm-1.0 mm.

13. The insulation film of claim 10, wherein the film upper layer, the film intermediate layer and the film lower layer are co-extruded.

14. An insulation film, comprising first and second PP layers containing a flame retardant and a third PP layer not containing a flame retardant or only containing a small amount of flame retardant, wherein the first and second PP layers containing the flame retardant are respectively bound together with an upper surface and a lower surface of the third PP layer not containing a flame retardant or only containing a small amount of flame retardant.

15. The insulation film according to claim 14, wherein the flame retardant in the first and second PP layers containing the flame retardant comprises a phosphor-containing flame retardant, a nitrogen-containing flame retardant, a phosphor-nitrogen-containing flame retardant, a silicon-containing flame retardant, a bromine-containing flame retardant or a chlorine-containing flame retardant.

16. The insulation film according to claim 15, wherein the PP accounts for 50-95 of a mass of the first and second PP layers containing the flame retardant, and the flame retardant accounts for 5-50 of the mass of the first and second PP layers containing the flame retardant.

17. The insulation film according to claim 14, wherein the flame retardant in the third PP layer not containing the flame retardant or only containing a small amount of flame retardant comprises a phosphor-containing flame retardant, a nitrogen-containing flame retardant, a phosphor-nitrogen-containing flame retardant, a silicon-containing flame retardant, a bromine-containing flame retardant or a chlorine-containing flame retardant.

18. The insulation film according to claim 17, wherein the mass of the flame retardant in the third PP layer not containing a flame retardant or only containing a small amount of flame retardant is less than 25% of a mass of the third PP layer not containing a flame retardant or only containing a small amount of flame retardant.

19. The insulation film according to claim 14, wherein when the thickness of the insulation film is 0.4 mm, after being subjected to pre-treatment at a temperature of 90 and under a 90% RH for 96 hours, the insulation film has a breakdown strength of not less than 20 KVAC/mm.

20. The insulation film according to claim 14, wherein the insulation film having a thickness of 0.4 mm has a foldability of not less than 100 times under a test method ASTM D2176-97a.

21. The insulation film according to claim 14, wherein the thickness of the third PP layer not containing a flame retardant or only containing a small amount of flame retardant is 5-45 of the thickness of the insulation film, and a total of the thickness of the first and second PP layers containing the flame retardant is 55-95 of a total thickness of the insulation film.

22. The insulation film according to claim 14, wherein the total thickness of the insulation film is in a range of 0.05 mm-3.0 mm.

23. The insulation film according to claim 14, wherein the insulation film is formed by a co-extruding process or a composite process.

24. The insulation film of claim 14, wherein the total thickness of the insulation film is in a range of 0.05 mm-1.0 mm.

25. The insulation film of claim 23, wherein the first PP layer, the second PP layer and the third PP layer are co-extruded.

* * * * *